United States Patent
Wu

(10) Patent No.: US 7,213,159 B2
(45) Date of Patent: May 1, 2007

(54) METHOD FOR TESTING AND VERIFYING POWER MANAGEMENT FEATURES OF COMPUTER SYSTEM

(75) Inventor: Chia-Chuan Wu, Fongshan (TW)

(73) Assignee: Mitac Technology Corp., Hsin-Chu, Hsien (TW)

( * ) Notice: Subject to any disclaimer, the term of this patent is extended or adjusted under 35 U.S.C. 154(b) by 513 days.

(21) Appl. No.: 10/866,658

(22) Filed: Jun. 15, 2004

(65) Prior Publication Data

US 2005/0278560 A1 Dec. 15, 2005

(51) Int. Cl.
*G06F 1/25* (2006.01)
*G01R 31/3181* (2006.01)

(52) U.S. Cl. .......................... 713/300; 714/724
(58) Field of Classification Search ................ 713/300; 714/724
See application file for complete search history.

(56) References Cited

U.S. PATENT DOCUMENTS 5,107,498 A * 4/1992 Hagihara et al. ............ 714/36
5,377,200 A * 12/1994 Pedneau ..................... 714/733
6,453,461 B1 * 9/2002 Chaiken ...................... 717/124
6,980,944 B1 * 12/2005 Oshins et al. ................ 703/17

* cited by examiner

*Primary Examiner*—Thuan Du
(74) *Attorney, Agent, or Firm*—Rosenberg, Klein & Lee

(57) ABSTRACT

A method of automatically testing and verifying power management features of a computer system in different modes including Standby, Hibernate, Shutdown, and Reboot is disclosed. After an operator has chosen on an operation menu screen one or more items for executing the power state test and set related numeric values for the chosen items, power state testing functions are executed according to the chosen test items, and the computer system sequentially enters into the power states chosen to test. Auto Resume is set for a timer in a keyboard controller of the computer system to repeatedly execute the chosen power state tests when a time value set for the timer is reached. The method is adapted to test and verifying different power states of the computer system, including Standby, Hibernate, Shutdown, and Reboot, and can be executed without being limited by any computer-specific hardware.

9 Claims, 3 Drawing Sheets

METHOD FOR TESTING AND VERIFYING POWER MANAGEMENT FEATURES OF COMPUTER SYSTEM

BACKGROUND OF THE INVENTION

1. Field of the Invention

The present invention relates to a technique of testing a computer system, and more particularly to a method of testing and verifying power management features of a computer system in different modes including Standby, Hibernate, Shutdown, and Reboot.

2. The Related Art

The currently widely employed Windows operating systems, including Windows XP, Windows 2000, and Windows Me, all employ the Advanced Configuration and Power Interface (ACPI) included in the Basic Input and Output System (BIOS) of a computer system to provide power management features. The computer system with ACPI is able to control the power management of hardware in connection with the computer system.

ACPI is a power management system interface cooperatively developed and established by computer manufacturers for the purpose of providing a power management interface common to operating systems and hardware, so as to overcome the problem raised from various interfaces separately established by the computer manufacturers for computer power management. With ACPI, the operating system could well control power to the peripherals of the computer system in a defined manner.

The power management features defined by ACPI include Active, Hibernate, Standby, and Shutdown. The computer system may be put into the Standby or the Hibernate mold according to a user's setting. The Standby mode places the entire computer system in a low-power state, while the Hibernate mode puts the computer system into an even power-saving state. These power management features are particularly useful to portable computers that are battery-powered.

A typical portable computer includes a central processing unit (CPU), a system Basic Input Output System (SYS-BIOS), and a keyboard controller (KBC). The keyboard controller includes an embedded micro-controller, a keyboard Basic Input Output System (KB-BIOS), a memory, and other interfacing circuits with special functions. The portable computer is battery-powered. A battery state detecting interface in the keyboard controller is adapted to detect the power state of the battery in the portable computer. When the portable computer works under an operating system supporting ACPI, the operating system will periodically read battery state data in the keyboard controller using ACPI machine language (AML).

In a typical ACPI architecture of a computer system, it could place the computer into five different power states including:

S0—Active, with all power on;

S1—Standby, with display and drives powered off, but power maintained for central processing unit, memory and fans;

S2—Standby, with central processing unit and cache power off;

S3—Standby, with only minimal power maintained to Random Access Memory (RAM) for a fast startup;

S4—Hibernate with all power off and the image of the computer system saved to disk; and S5—Complete power off with all files closed and no image saved to disk.

The computer goes into the Standby or the Hibernate mold depending on the user's setting. The Standby mode places the entire computer system in a low-power state, while the Hibernate mode puts the computer system into an even power-saving state. These power management features are particularly useful to portable computers that are battery-powered.

To ensure the computer system in use to execute various functions in a normal condition, the computer manufacture has to test and verify all features provided to the computer system as soon as the complicate hardware assembling is completed. For example, it is a very important issue in what manner different power states of the computer system should be tested to ensure that the computer operating system executes the above-mentioned ACPI power management feature normally. To test whether a computer system has normal power management functions or not, it is a common way to repeat the procedures of boot, standby, hibernation, shutdown, and reboot.

With the existing techniques, a tester has to stand in front of the computer system over a long time to repeat the tests of the above-mentioned functions of standby, hibernation, shutdown, and reboot, and to manually record how many times the tests have been completed. Therefore, the traditional way of testing power state is time-consuming and requires a considerably high labor cost.

To overcome the inconvenience existed in the traditional power state testing technique, there have been developed many new techniques in prior art for automatically testing the computer power state. However, these techniques necessitate association of software with specific hardware to enable the test. The software alone is not able to execute the test without the specific hardware. Therefore, these newly developed techniques are not only expensive, but also lack good flexibility and adaptation in their applications.

SUMMARY OF THE INVENTION

It is therefore a primary object of the present invention to provide a method of testing and verifying power management features of a computer system to eliminate the drawbacks existed in the conventional techniques. With the method of the present invention, an operator may choose the power state items to be tested and set the related numeric values, and then the computer system would execute testing functions according to the chosen power state test items under the flow control of the present invention, and sequentially enter into different power states that are chosen for test.

Another object of the present invention is to provide a method of automatically testing power management features of a computer system. With the method of the present invention, an operator may choose different power state test items to be tested and set the computer system to automatically resume the chosen tests.

A further object of the present invention is to provide a method of automatically testing and verifying computer power state that is not limited by any computer-specific hardware. The present invention uses a keyboard controller of the computer system to execute different power state tests, including auto shutdown, standby, hibernation, etc., without being limited by computer-specific hardware and operating system, and is therefore highly flexible to adapt to various kinds of hardware and operating systems.

To achieve the above objects, in accordance with the present invention, there is provided a method for testing power states of a computer system in different modes, including Standby, Hibernate, Shutdown, and Reboot. After an operator has chosen on an operation menu screen one or more items for executing the power state test and set related numeric values for the chosen items, power state testing functions are executed according to the chosen test items, and the computer system sequentially enters into the power states chosen to test. Auto Resume is set for a timer in a keyboard controller of the computer system to repeatedly execute the chosen power state tests when an auto resume time value set for the timer is reached. The method is adapted to test and verifying different power states of the computer system, including Standby, Hibernate, Shutdown, and Reboot, and can be executed without being limited by any computer-specific hardware.

By means of the testing and verifying method of the present invention, the power states to be tested can be completed simply with the keyboard controller of the computer system without the need of using any computer-specific hardware and operating system. This enables the present invention to be highly flexible in its application and to adapt to various kinds of hardware and operating system environments.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
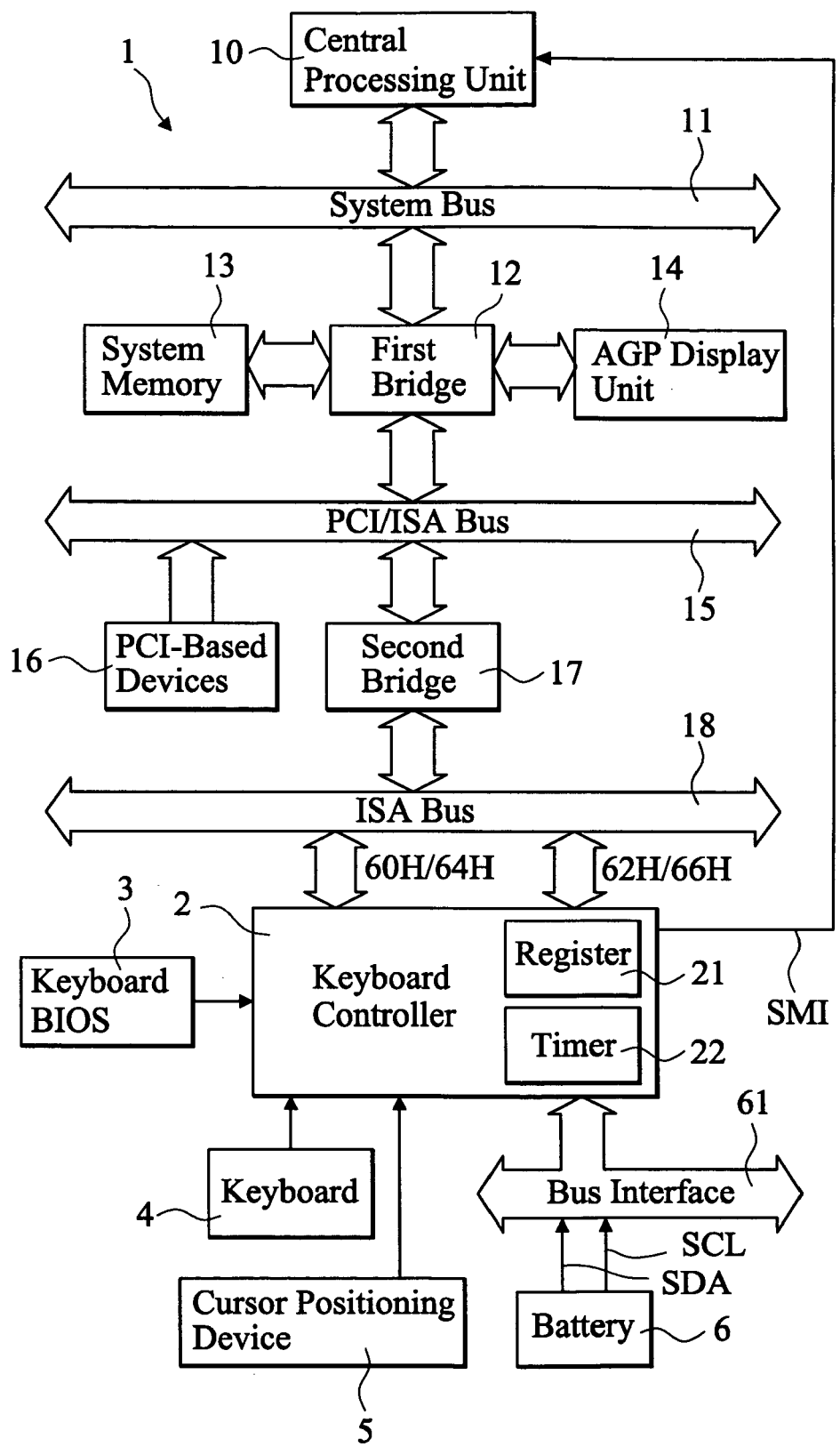
FIG. 1 is a simplified functional circuit block diagram showing the present invention is employed on a computer system with an embedded keyboard controller.

Please refer to FIG. 1 that is a simplified functional circuit block diagram showing the present invention is employed on a computer system with embedded keyboard controller. The computer system 1 includes a central processing unit (CPU) 10, a system bus 11 connected to a first bridge 12 (also referred to as host bridge or north bridge), a main memory 13 connected to the first bridge 12 via a memory bus, a display unit 14 connected to the first bridge 12 via an AGP (Accelerated Graphics Port) bus, a PCI (peripheral component interconnect) bus 15 connected to the first bridge 12 for various types of PCI-based devices 16 to connect thereto, and a second bridge 17 (also referred to as south bridge) connected to the PCI bus 15 and to an extended bus, such as an ISA (Industry Standard Architecture) bus 18.

A keyboard controller 2 is connected to the ISA bus 18. More specifically, the keyboard controller 2 includes a host interface connected to the ISA bus 18 of the computer system 1 to serve as an interface with the central processing unit 10 to perform transmission of data. In a typical system architecture between an embedded controller and a computer system, the host interface of the keyboard controller 2 includes two address zones, one of which is a hexadecimal address 60H/64H connected to a keyboard interface inside the keyboard controller 2 to serve as a standard keyboard input function, and the other of which is a hexadecimal address 62H/66H connected to a system management controller embedded in the keyboard controller 2 to execute system management functions.

The keyboard controller 2 is able to generate a system management signal SMI (system management interrupt) to the central processing unit 10 of the computer system 1. In executing a system management function, the keyboard controller 2 first stores a numeric value in a register 21 inside the keyboard controller 2, and then generates the system management signal SMI to the central processing unit 10. Thereafter, the central processing unit 10 responds to the system management signal SMI according to a system management code previously stored in the main memory 13, and processes an executive action represented by the numeric value stored in the register 21 in the keyboard controller 2. The keyboard controller 2 also includes a timer 22 that is programmable to count.

The keyboard controller 2 has a keyboard Basic Input and Output System (KBIOS) 3 connected thereto. Most of the currently available keyboard controllers 2 are adapted to connect with a keyboard 4 and a cursor positioning device 5. Under the control of the keyboard controller 2, signals input via the keyboard 4 and the cursor positioning device 5 may be sent to the computer system.

The computer system 1 is powered by a power source, such as a battery 6. The battery 6 may be a smart battery that has been widely employed now. The battery 6 is connected to the keyboard controller 2 via a bus interface 61, which may be, for example, a system management bus (SMBus). In a standard wiring of the system management bus, there is a clock line SCL and a data line SDA for connecting to the battery 6.

Figure 2:
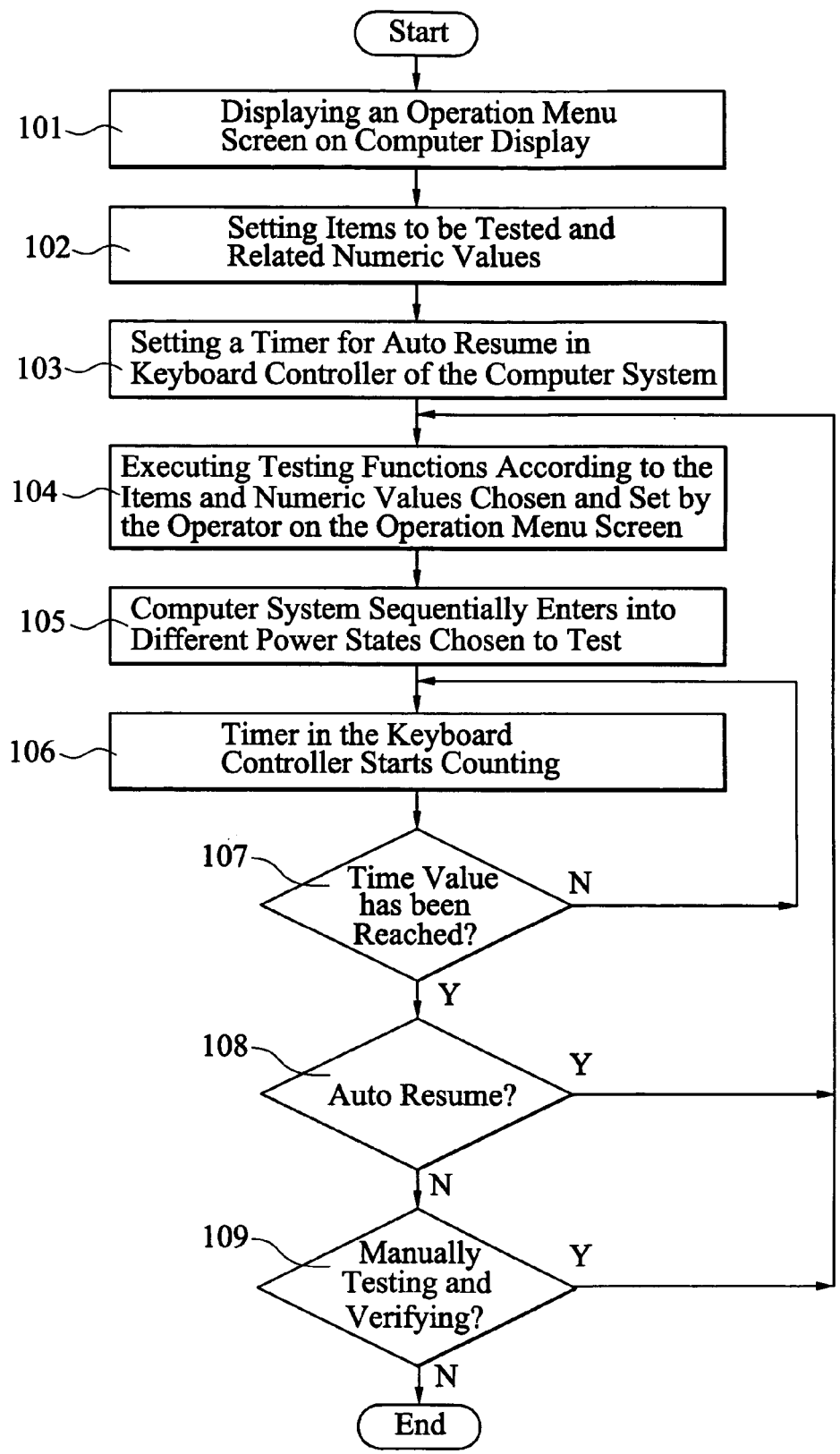
FIG. 2 is a flow chart showing the steps included in a computer power state test according to the method of the present invention.
Figure 3:
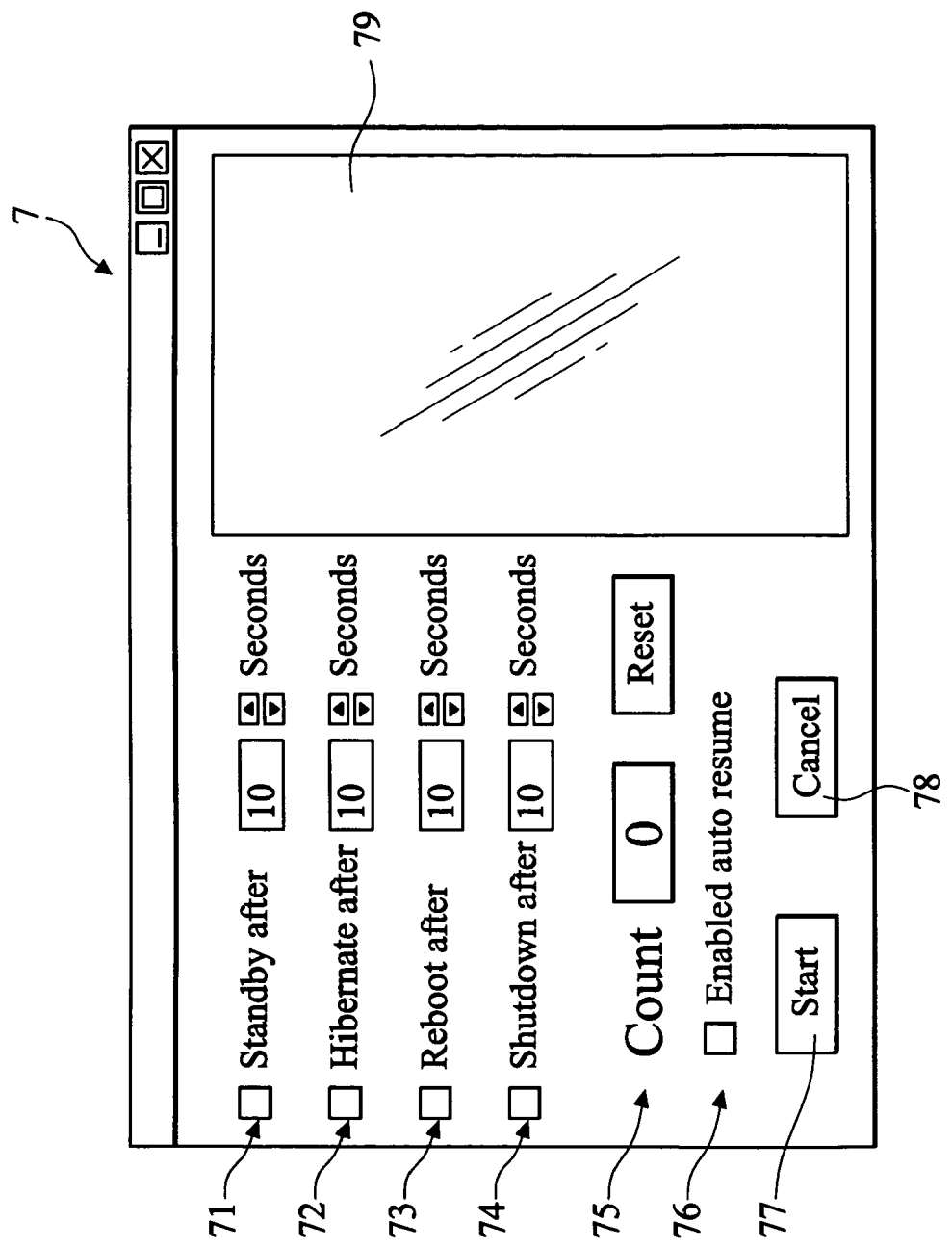
FIG. 3 shows an operation menu screen displayed on the computer system in executing the method of the present invention.

Please refer to FIG. 2 that is a flowchart showing the steps included in an automatic computer power state test according to the method of the present invention. In Step 101, an operation menu screen 7 (see FIG. 3) is displayed on a display of the computer system, so that an operator may select or set power state test item to be tested and related numeric values (Step 102). For example, the operation menu screen 7 may include, as shown in FIG. 3, the following areas and buttons:

1. Standby Test setting area 71: an operator may check here to choose a Standby test, and set the time (in second) after which the computer system goes into Standby;

2. Hibernation Test setting area 72: an operator may check here to choose a Hibernation test, and set the time (in second) after which the computer system goes into Hibernation;

3. Reboot Test setting area 73: an operator may check here to choose a Reboot test, and set the time (in second) after which the computer system is rebooted;

4. Shutdown Test setting area 74: an operator may check here to choose a shutdown test, and set the time (in second) after which the computer system is shutdown;

5. Count setting area 75: an operator may click here to set how many times the tests are to be repeated, or clear the setting;

6. Auto Resume setting area 76: an operator may check here to choose enabling auto resume of the selected tests;

7. Start button 77: an operator may click here to start the previously chosen tests;

8. Cancel button 78: an operator may click here to cease the previously chosen tests; and 9. Test Result Display area 79: all test results are displayed in this area for the operator to have an idea about the test conditions and to analyze the test results.

After the operator has chosen the items to be tested and set the related numeric values on the operation menu screen 7, a timer 22 for Auto Resume is set in the keyboard controller 2 of the computer system 1 (Step 103). After the operator has clicked the Start button 77 on the operation menu screen 7, the computer system, under a control flow of the present invention, starts executing testing functions according to the test items and numeric values chosen and set by the operator on the operation menu screen 7 (Step 104). Meanwhile, the computer system sequentially enters into different power states chosen to test according to the chosen testing functions (Step 105); and the timer 22 in the keyboard controller 2 starts counting (Step 106).

While the previously chosen power state tests are sequentially executed and the timer 22 counts, it is determined in Step 107 whether the auto resume time value set for the timer has been reached or not. If not, it is returned to the Step 6 and the counting continues.

Or, when it is determined in the Step 107 that the auto resume time value set for the timer 22 has been reached, it is further determined in Step 108 whether the operator has previously manually set the Auto Resume function. If yes, it is returned to the Step 104 to automatically repeat the testing and determining functions in Steps 104 to 108.

Or, when it is determined in the Step 108 that the operator did not set the Auto Resume function, it is then further determined whether the operator has manually started the above-mentioned testing functions (Step 109). If yes, it is returned to the Step 104 to execute the testing and determining functions in Steps 104 to 109. Or, if not, the tests are completed.

From the above embodiment of the present invention, it is found the power state tests chosen by the operator can be completed simply with the keyboard controller of the computer system without the need of using any computer-specific hardware and operating system. This enables the present invention to be highly flexible in its application and to adapt to various kinds of hardware and operating system environments. The operator needs only to choose the desired power state test items and set related numeric values and/or auto resume, and the computer system would, under the flow control of the present invention, automatically execute the testing functions according to the chosen power state test items, and sequentially complete all the chosen power state tests.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for testing and verifying power states of a computer system powered by a power source, having a keyboard controller coupled a keyboard to the computer system, comprising the steps of:
   (a) choosing at least one power state to be tested and setting numeric values for the chosen power state;
   (b) setting an auto resume time value to a timer in the keyboard controller;
   (c) executing the power state in accordance with the chosen power state in step (a);
   (d) placing the computer system to be operated in the chosen power state, and starting counting by said timer in the keyboard controller; and
   (e) repeating steps (c) to (d) each time when the auto resume time value is reached.

2. The method as claimed in claim 1, further comprising a step of showing an operation menu screen on a display unit of said computer system before the step (a).

3. The method as claimed in claim 2, wherein the operation menu screen on the display unit comprises a Standby Test setting area, a Hibernation Test setting area, a Reboot Test setting area, a Shutdown Test setting area, a Count setting area, an Auto Resume setting area, a Start button, a Cancel button.

4. The method as claimed in claim 3, the operation menu screen further comprising a Test Result display area.

5. The method as claimed in claim 1, wherein the power state comprises a standby state, and said computer system operated in the Standby state cuts the power source to at least one of following devices including a monitor, a disk drive, a central processing unit, a memory, a cooling fan, a cache memory, and a random access memory (RAM), all of which are coupled to the computer system.

6. The method as claimed in claim 1, wherein the power state comprises a Hibernate state, and said computer system operated in the Standby state cuts power source to devices including a monitor, a disk drive, a central processing unit, a memory, a cooling fan, a cache memory, and a random access memory (RAM), all of which are coupled to the computer system.

7. The method as claimed in claim 1, wherein the power state comprises a Reboot test for testing a rebooted operation of the computer system.

8. The method as claimed in claim 1, wherein the power state comprises a Shutdown test for testing a shutdown operation of the computer system.

9. The method as claimed in claim 1, further comprising a step of determining whether steps (c) to (d) are repeated.

* * * * *